(12) United States Patent
Delplanque et al.

(10) Patent No.: US 11,143,116 B2
(45) Date of Patent: Oct. 12, 2021

(54) VALVE WITH THERMALLY INSULATING COUPLING AND EXHAUST LINE COMPRISING SUCH A VALVE

(71) Applicant: FAURECIA SYSTEMES D'ECHAPPEMENT, Nanterre (FR)

(72) Inventors: Gilbert Delplanque, Sochaux (FR); Raphael De Matos, Saone (FR); Alain Mercier, Nommay (FR); Jean-Pierre Leon, Houilles (FR)

(73) Assignee: FAURECIA SYSTEMES D'ECHAPPEMENT

( * ) Notice: Subject to any disclaimer, the term of this patent is extended or adjusted under 35 U.S.C. 154(b) by 235 days.

(21) Appl. No.: 16/495,611

(22) PCT Filed: Mar. 20, 2017

(86) PCT No.: PCT/FR2017/050652
§ 371 (c)(1),
(2) Date: Nov. 14, 2019

(87) PCT Pub. No.: WO2018/172625
PCT Pub. Date: Sep. 27, 2018

(65) Prior Publication Data
US 2020/0088113 A1    Mar. 19, 2020

(51) Int. Cl.
*F02D 9/10* (2006.01)
*F16K 31/04* (2006.01)
*F02D 9/04* (2006.01)

(52) U.S. Cl.
CPC ............ *F02D 9/1065* (2013.01); *F02D 9/04* (2013.01); *F02D 9/1005* (2013.01); *F16K 31/047* (2013.01)

(58) Field of Classification Search
CPC ........ F02D 9/1065; F02D 9/1005; F02D 9/04; F16K 31/041; F16K 31/042; F16K 31/043; F16K 31/047; F16D 1/108; F16D 1/116
See application file for complete search history.

(56) References Cited

U.S. PATENT DOCUMENTS

2013/0270470 A1* 10/2013 Bonanno ............... F16K 31/041
                                                        251/129.11
2017/0074407 A1*  3/2017 Haesen .................... F16K 1/221
(Continued)

FOREIGN PATENT DOCUMENTS

DE   102011107088 A1   1/2013
JP       H0586907 A    4/1993
(Continued)

OTHER PUBLICATIONS

Translation of WO2010103249 (Year: 2021).*
International Search Report from PCT/FR2017/050652.

*Primary Examiner* — Kelsey E Cary
(74) *Attorney, Agent, or Firm* — Carlson, Gaskey & Olds, P.C.

(57) ABSTRACT

A valve comprises a kinematic chain having a rotary driving member, a rotary driven member, and an intermediate member. The driving member has a driving contact element in flat or linear abutment on a complementary driving contact element of the intermediate member. The driven member has a driven contact element in flat or linear abutment on a complementary driven contact element of the intermediate member. The complementary driving contact element and the complementary driven contact element (49) together form an angle between 45° and 135°.
A driving elastic member urges the driving contact element against the complementary driving contact element.

(Continued)

A driven elastic member urges the driven contact element against the complementary driven contact element.

15 Claims, 6 Drawing Sheets

(56) References Cited

U.S. PATENT DOCUMENTS

2018/0010693 A1* 1/2018 Schmitt .................... F16D 3/18
2020/0256477 A1* 8/2020 Schmitt .................... F02D 9/04

FOREIGN PATENT DOCUMENTS

| JP | H06167262 A | 6/1994 |
| WO | 2009021722 A1 | 2/2009 |
| WO | 2010103249 A1 | 9/2010 |
| WO | 2018172625 A1 | 9/2018 |

* cited by examiner

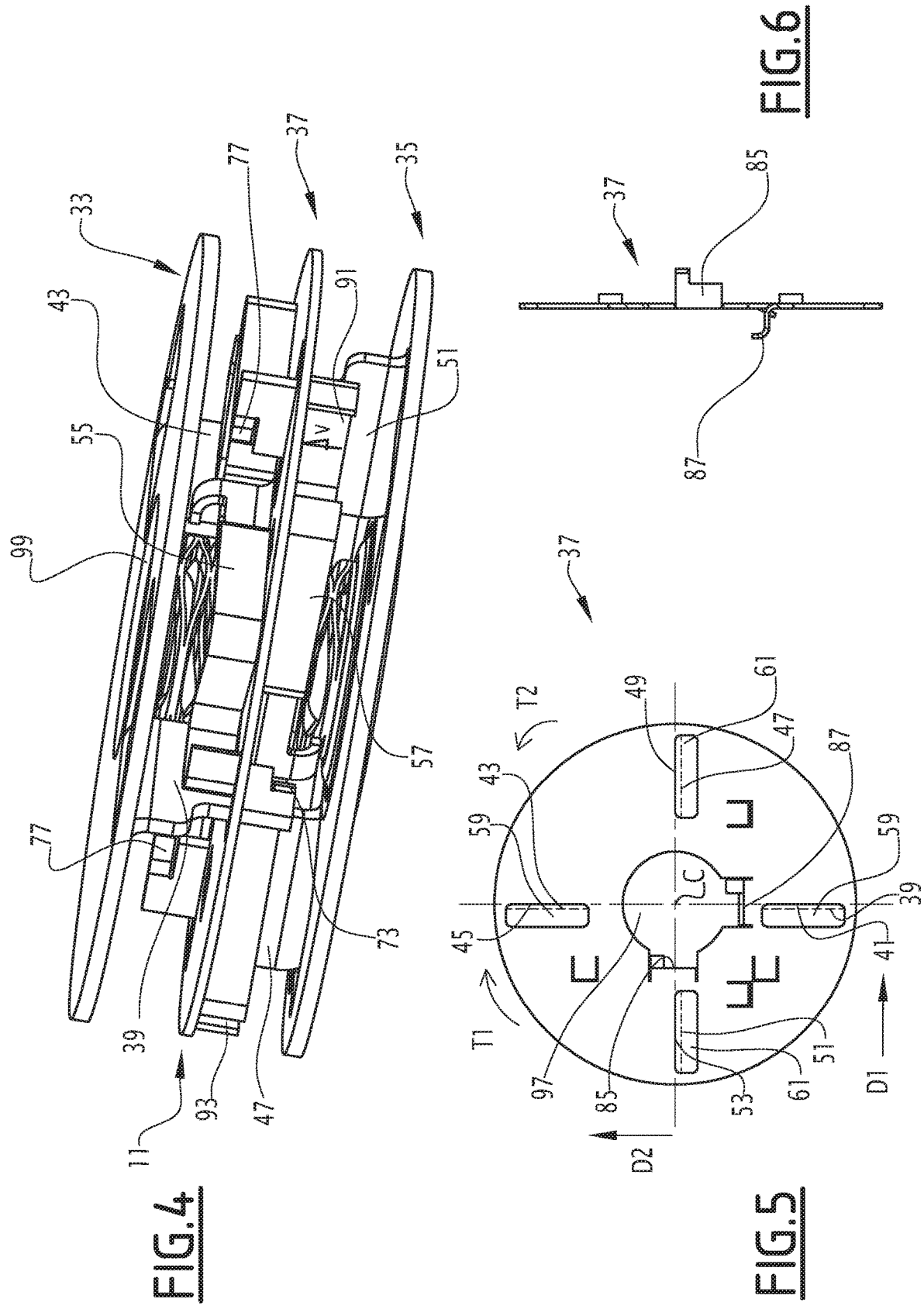

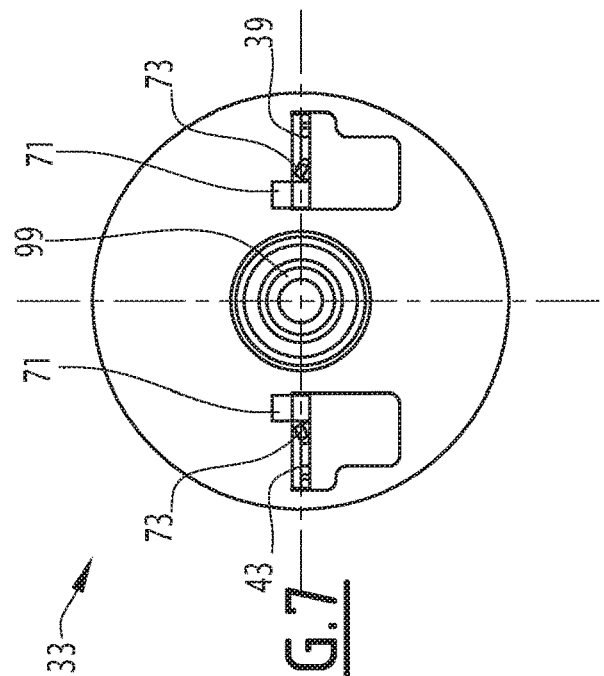
FIG.7
FIG.8
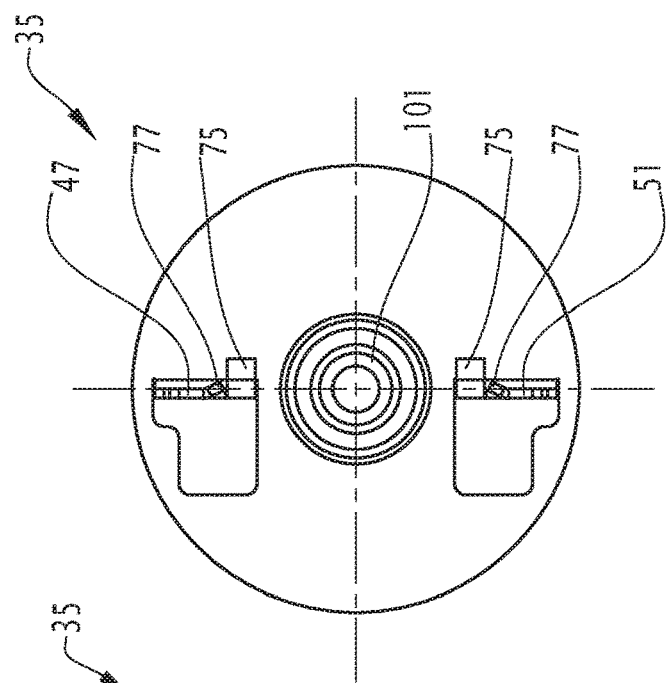
FIG.9
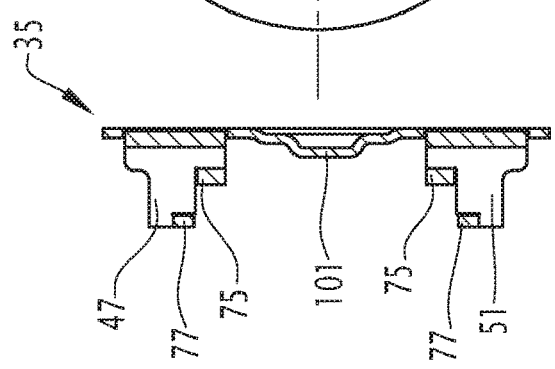
FIG.10

VALVE WITH THERMALLY INSULATING COUPLING AND EXHAUST LINE COMPRISING SUCH A VALVE

CROSS-REFERENCE TO RELATED APPLICATIONS

This application is the US national phase of PCT/FR2017/050652, filed Mar. 20, 2017.

TECHNICAL FIELD

The present invention generally relates to valves intended to be used in high-temperature circuits, such as exhaust lines.

More specifically, according to a first aspect, the invention relates to a valve of the type comprising an actuator having a motor shaft, a flap having a drive shaft, and a kinematic chain coupling the drive shaft to the motor shaft in rotation, the kinematic chain comprising:
- a driving member rotating around a first rotation axis, and connected in rotation to the motor shaft; and
- a driven member rotating around a second rotation axis substantially aligned with the first rotation axis, and connected in rotation to the drive shaft.

BACKGROUND

Such a valve is, for example, known from WO 2010/103249. This document describes a valve whereof the drive shaft is coupled to the motor shaft by a joint of the Oldham type. Such a joint makes it possible to thermally uncouple the actuator from the drive shaft. It makes it possible to transmit the movement from the motor shaft to the drive shaft while absorbing the geometric variations of the kinematic chain, for example any misalignment of the shafts.

Conversely, when the actuator is equipped with a position sensor, it is not possible to precisely know the position of the flap by using the sensor. Furthermore, the flap of the valve may begin to vibrate, which is a source of noise.

SUMMARY

A valve is provided that does not have the above flaws.

Specifically, a valve of the aforementioned type, further includes a kinematic chain comprising:
- an intermediate member positioned axially between the driving member and the driven member, the driving member having a driving contact element in planar or linear bearing on a complementary driving contact element of the intermediate member, the driven member having a driven contact element in planar or linear bearing on a complementary driven contact element of the intermediate member, the complementary driving contact element and the complementary driven contact element forming an angle with one another comprised between 45° and 135°;
- a driving elastic member inserted between the driving member and the intermediate member and urging the driving contact element against the complementary driving contact element;
- a driven elastic member inserted between the driven member and the intermediate member and biasing the driven contact element against the complementary driven contact element.

Thus, the driving elastic member forces the driving contact element to remain in bearing against the complementary driving contact element. The transmission of movement from the driving member to the intermediate member is homokinetic. Likewise, the driven elastic member forces the driven contact element to remain in bearing against the complementary driven contact element. The transmission of movement between the intermediate member and the driven member is also homokinetic. As a result, it is possible to make an extremely precise determination of the position of the valve flap by using a position sensor located at the actuator.

Furthermore, at the end of travel of the flap, the driving elastic and driven members make it possible to impose a torque on the flap. The latter is urged against the seat serving as end-of-travel stop for the flap. This contributes to reducing the noises emitted by the valve during operation.

Due to the fact that the contact between the driving member, the intermediate member and the driven member is limited to planar or linear areas, the transmission of heat from the drive shaft to the motor shaft is reduced.

The fact that the complementary driving contact element and the complementary driven contact element are substantially perpendicular to one another makes the kinematic chain capable of absorbing assembly allowances, in particular related to the fact that the first rotation axis is not strictly parallel to and aligned with the second rotation axis.

The valve may further have one or more of the features below, considered individually or according to any technical possible combination(s):
- the driving contact element is substantially radial relative to the first rotation axis and the driven contact element is substantially radial relative to the second rotation axis;
- the driving member comprises another driving contact element in planar or linear bearing on a complementary driving contact element of the intermediate member, the driven member comprising another driven contact element in planar or linear bearing on another complementary driven contact element of the intermediate member;
- the complementary driving contact element and the other complementary driving contact element are substantially in the extension of one another;
- the complementary driven contact element and the other complementary driven contact element are substantially in the extension of one another;
- the driving elastic member biases the other driving contact element against the other complementary driving contact element;
- the driven elastic member biases the other driven contact element against the other complementary driven contact element;
- the driving elastic member biases the driving contact element against the complementary driving contact element along a first direction, and biases the other driving contact element against the other complementary driving contact element along the same first direction;
- the driven elastic member biases the driven contact element against the complementary driven contact element along a second direction, and biases the other driven contact element against the other complementary driven contact element along the same second direction;
- the first and second directions are substantially perpendicular to one another.
- the driving contact element and the other driving contact element are positioned symmetrically relative to the first rotation axis, the driven contact element and the other driven contact element being positioned symmetrically relative to the second rotation axis;

the driving elastic member and/or the driven elastic member are preloaded and only deform if a torque greater than 0.1 N·m is transmitted respectively between the driving member and the intermediate member and/or between the driven member and the intermediate member;

the flap can be moved by the actuator between extreme positions, the flap abutting against a seat in at least one of the extreme positions;

the kinematic chain comprises an elastic device axially biasing the driven member so as to separate it from the driving member.

the intermediate member is a plate;

the intermediate member includes driving and driven orifices cut out in the plate, the complementary driving contact element and the complementary driven contact element being edges respectively of the driving orifice and the driven orifice, respectively;

the driving member and the driven member are plates;

the driving contact element and the driven contact element are tabs cut out in the driving member and the driven member, respectively, and engaged in the driving and driven orifices, respectively;

the driving contact element and/or the driven contact element include stops limiting the axial movement of the intermediate member relative to the driving and/or driven members;

the driving member and the driven member are identical;

the driving elastic member and the driven elastic member are identical;

the intermediate member has first and second faces opposite one another, these first and second faces being symmetrical to one another such that the intermediate member is capable of being mounted indifferently with the first face facing the driving member and the second face facing the driven member or with the first face facing the driven member and the second face facing the driving member;

the intermediate member comprises a fastener of the driving elastic member and/or of the driven elastic member on the intermediate member;

the driving elastic member and the driven elastic member are respectively alongside against the driving contact element and against the driven contact element by curved areas, with no protruding edges;

the driving and driven members are each an integral sheet;

the elastic device is kept in position on the driving member and on the driven member by raised areas of the driving member and the driven member.

According to a second aspect, the invention relates to an exhaust line comprising a valve having the above features.

BRIEF DESCRIPTION OF THE DRAWINGS

Other features and advantages of the invention will emerge from the detailed description given below, by way of indication and without limitation, with reference to the annexed figures, including:

FIG. 4 is an assembled few of the various member elements of FIG. 3;

FIGS. 5 and 6 are respectively bottom and side views of the intermediate member, the bottom view being considered along arrow V of FIG. 4, the driving and driven members being shown by mixed lines;

FIGS. 7 and 8 are respectively top and side views of the driving member;

FIGS. 9 and 10 are respectively top and side views of the driven member;

DETAILED DESCRIPTION

Figure 1:
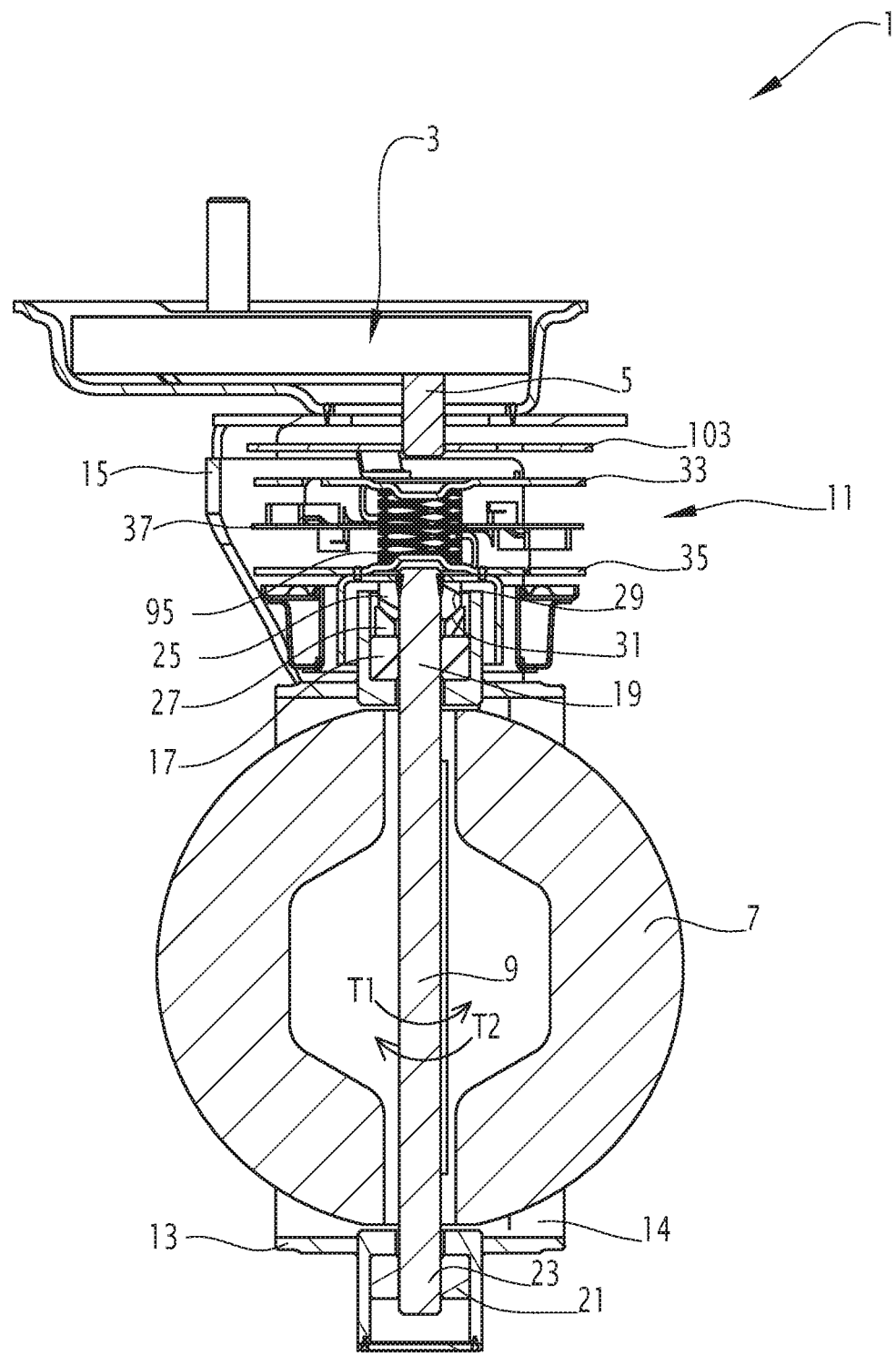
FIG. 1 is a schematic sectional illustration of a valve according to the invention.

The valve 1 shown in FIG. 1 is suitable for being inserted typically on a vehicle exhaust line. This vehicle is typically a motor vehicle, for example a car or truck.

In a variant, this valve is used in any other high-temperature fluid circuit.

In an exhaust line, the valve 1 preferably fulfills one of the functions below:
  improving the acoustics of the vehicle by opening or closing, partially or fully, a duct of the exhaust line, based on the duty point of the engine;
  improving pollutant emissions, in particular nitrogen oxides, by adjusting the back pressure in the exhaust line, so as to regulate the recirculation rate of the exhaust gases in the engine;
  orienting the exhaust gases selectively inside or outside an energy recovery member, for example a heat exchanger;
  orienting the exhaust gases selectively inside or outside and exhaust gas pollution control member.

The valve 1 comprises an actuator 3 having a motor shaft 5, a flap 7 having a drive shaft 9, and a kinematic chain 11 rotatably coupling the drive shaft 9 to the motor shaft 5.

Typically, the valve 1 includes a valve body 13 inwardly forming a passage 14 traveled by the high-temperature fluid. The flap 7 is placed inside the valve body 13, and rotated by the actuator 3 relative to the valve body 13.

Typically, the actuator 3 is fastened to the valve body 13 by one or several tabs 15.

The actuator 3 is of any suitable type. Typically it is a gear motor, preferably an electric gear motor.

The valve 1 is, for example, an on-off valve. In this case, the flap 7 is able to adopt a first extreme position in which the flap prohibits the circulation of the fluid through the valve body. It is also able to adopt a second extreme position, in which the circulation of the fluid through the valve body is allowed.

In a variant, the valve is of the adjustable type, the flap being able to adopt a plurality of intermediate positions partway between the first and second extreme positions. Each intermediate position corresponds to a degree of partial opening, making it possible to vary the passage section offered to the fluid traveling through the valve body 13.

The flap 7 abuts against a seat or a stop in at least one of the extreme positions, typically both extreme positions.

The flap 7 is arranged in any way possible on the drive shaft 9.

For example, the valve 1 is of the butterfly type, the flap 7 being fastened to the drive shaft 9 along a median line of said flap 7 (see FIG. 1). In a variant, the valve is of the gate type, the flap being fastened to the drive shaft along an edge of said flap.

The valve body 13 has any suitable shape. For example, it has a tubular shape, with a circular or rectangular section, or any other suitable section.

In the example shown in FIG. 1, the valve body 13 is a tube with a circular section.

The valve 1 comprises at least a first bearing 17, arranged so as to guide a first end part 19 of the drive shaft 9 in rotation relative to the valve body 13.

Typically, the valve further includes a second bearing 21, arranged to guide the rotation of a second end part 23 of the drive shaft 9 in rotation relative to the valve body 13.

The or each bearing 17, 21 is rigidly fastened to the valve body 13.

The valve 1 advantageously includes a sealing member 25, rigidly fastened to the first end part 19 of the shaft.

Figure 2:
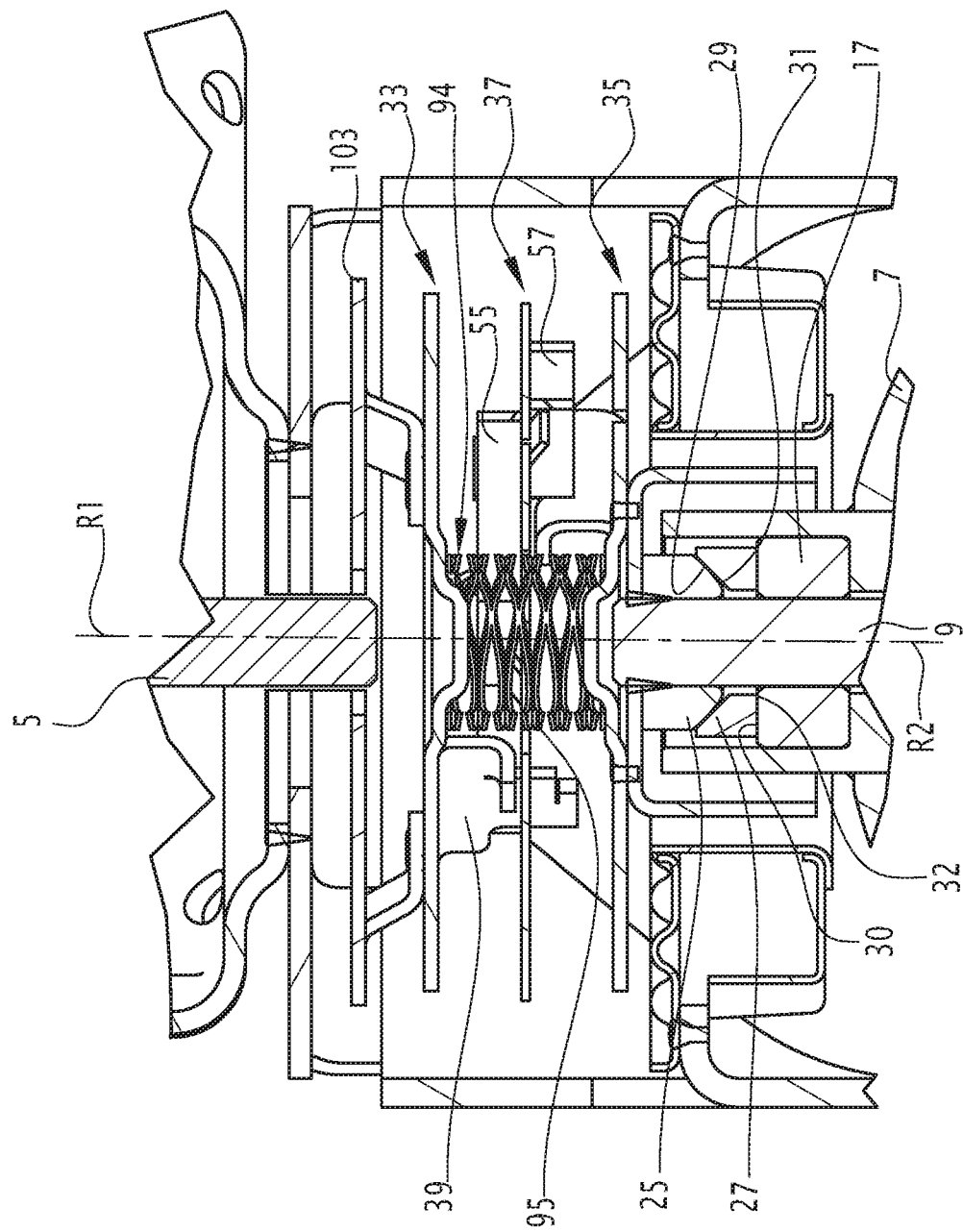
FIG. 2 is an enlarged illustration of the kinematic chain of the valve of FIG. 1.

The sealing member 25 cooperates with an additional sealing member 27 to prevent the exhaust gases from leaving the valve and spreading into the environment by passing between the drive shaft 9 and the first bearing 17. The complementary sealing member 27 belongs to the bearing 17 or is attached on the bearing 17. The sealing member 25 has a sealing step 29 bearing slidably against a complementary sealing step 31 formed on the member 27 (FIG. 2). The steps 29 and 31 completely surround the drive shaft 9 and are biased axially against one another as will be described below.

The complementary sealing member 27 has a sealing step 30 bearing slidably against a complementary sealing step 32 formed on the bearing 17 (FIG. 2). The steps 30 and 32 completely surround the drive shaft 9 and are biased axially against one another as will be described below.

The kinematic chain 11 comprises:
- a driving member 33 rotating around a first rotation axis R1, and rotated by the motor shaft 5;
- a driven member 35 rotating around a second rotation axis R2 substantially aligned with the first rotation axis R1, the driven member 35 rotating the drive shaft 9; and
- an intermediate member 37, arranged axially between the driving member 33 and the driven member 35.

Typically, the first rotation axis R1 corresponds to the rotation axis of the motor shaft 5, the driving member 33 being fastened to the motor shaft 5. In a variant, the first rotation axis R1 does not correspond to the rotation axis of the motor shaft 5, the driving member 33 then being rotated by the motor shaft 5 by a coupling of any suitable type, such as a reduction gear.

Likewise, the second rotation axis R2 typically corresponds to the rotation axis of the drive shaft 9, the driven member 35 being fastened to the drive shaft 9. In a variant, the second rotation axis R2 does not correspond to the rotation axis of the drive shaft 9, the driven member 35 being coupled to the drive shaft 9 by a coupling of any suitable type, for example a reduction gear.

In the present description, the axial direction corresponds to the direction defined by the first and second axes of rotation R1, R2, which are substantially aligned with one another. This means that the first and second axes of rotation R1, R2 together form an angle of less than 10°, preferably less than 5°, and still more preferably less than 3°.

Figure 3:
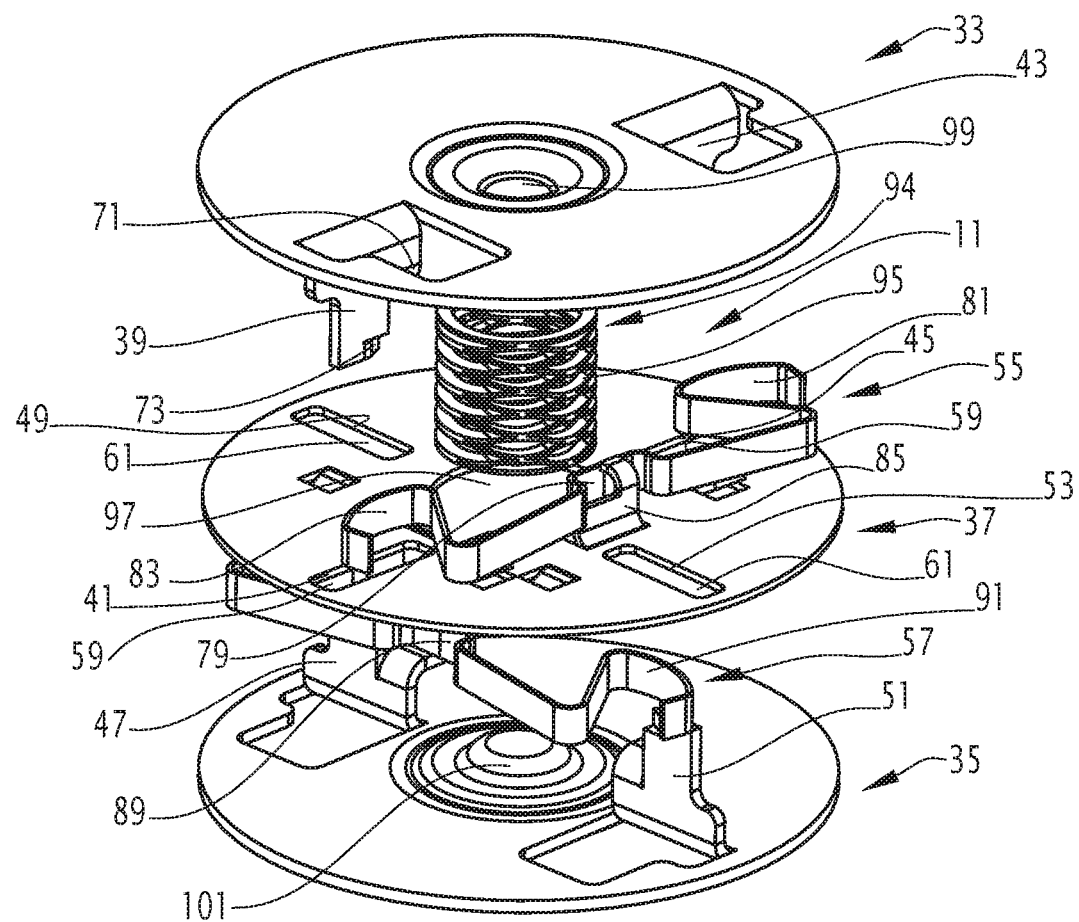
FIG. 3 is a perspective view of the driving member, the driven member and the intermediate member as well as the various elastic members of the kinematic chain of FIG. 1.

So as to ensure the transmission of the rotational movement from the driving member 33 to the intermediate member 37, the driving member 33 comprises a driving contact element 39 in planar or linear bearing on a complementary driving contact element 41 of the intermediate member 37 (FIG. 3). Preferably, the driving member 33 comprises another driving contact element 43 in planar or linear bearing on another complementary driving contact element 45 of the intermediate member 37 (see FIGS. 3 to 8).

Here, planar or linear bearing refers to a connection with five degrees of freedom, two in translation and three in rotation. The contact between the two contact elements of a same pair is done along a surface substantially having the form of a line or a plane.

The driven member 35 comprises a driven contact element 47 in planar or linear bearing on a complementary driven contact element 49 of the intermediate member 37. Advantageously, the driven member 35 comprises another driven contact element 51 in planar or linear bearing on another complementary driven contact element 53 of the intermediate member 37.

The driving contact element 39 and the other driving contact element 43 are in the extension of one another. More specifically, they fit in a same plane. Typically, they are arranged symmetrically relative to the first rotation axis R1.

Likewise, the driven contact element 47 and the other driven contact element 51 are placed in the extension of one another, and more specifically in the same plane. They are typically arranged symmetrically relative to the second rotation axis R2.

The driving contact element 39 is in a substantially radial plane relative to the first rotation axis R1. The other contact element 43 is therefore also preferably in a substantially radial plane relative to the axis R1.

The driven contact element 47, and preferably also the other driven contact element 51, is/are in a radial plane relative to the second rotation axis R2.

As a result, the complementary driving contact element 41 and the other complementary driving contact element 45 are also in the extension of one another, more specifically aligned with one another. The complementary driven contact element 49 and the other complementary driven contact element 53 are substantially in the extension of one another, and more specifically are typically aligned with one another.

The contact elements 41 and 45 are preferably arranged symmetrically relative to the center C of the intermediate member 37. The contact elements 49 and 53 are also arranged symmetrically relative to the center C. The center C is normally located on the first and second axes of rotation R1, R2, when the latter are aligned and when the kinematic chain 11 is at rest.

The complementary driving contact element 41 and the complementary driven contact element 49 together form an angle of between 45° and 135°, preferably between 60° and 120°, still more preferably between 80° and 100°.

Ideally, the complementary driving contact element 41 and the complementary driven contact element 49 are substantially perpendicular to one another. In other words, and as shown in FIG. 5, the contact elements 41, 49, 45 and 53 are arranged at 90° with respect to one another, around the center C.

Furthermore, the kinematic chain 11 includes a driving elastic member 55, interposed between the driving member 33 and the intermediate member 37, and biasing the driving contact element 39 against the complementary driving contact element 41.

Typically, the driving elastic member 55 also biases the other driving contact element 43 against the other complementary driving contact element 45.

The driving elastic member 55 biases the driving contact elements 39, 43 against the complementary elements 41, 45 along a same first direction D1 (see FIG. 5). The direction D1 is substantially perpendicular to the first and second axes of rotation R1, R2.

The kinematic chain 11 further includes a driven elastic member 57 interposed between the driven member 35 and the intermediate member 37. The latter biases the driven contact element 47 against the complementary driven contact element 49.

Typically, it also biases the other driven contact element 51 against the other complementary driven contact element 53.

The driven elastic member 57 typically biases the driven contact element 47 and the other driven contact element 51 against the complementary contact areas 49, 53 along the same second direction D2 (see FIG. 5). The direction D2 is typically perpendicular to the axes of rotation R1, R2.

Advantageously, the first and second directions D1, D2 are substantially perpendicular to one another.

Advantageously, the intermediate member 37 is a plate.

This plate has any type of shape, for example circular like in the illustrated examples, or rectangular, or any other suitable shape.

The intermediate member 37 is more specifically a thin metal plate, with a thickness smaller than 3 mm, preferably smaller than 2 mm, and still more preferably smaller than 1 mm.

The plate is substantially perpendicular to the axes of rotation R1 and R2.

The intermediate member 37 includes, in one preferred embodiment, driving and driven orifices 59, 61, cut out in the plate. Typically, the intermediate member 37 includes two driving orifices 59 and two driven orifices 61.

The complementary driving contact element 41 is an edge of the one of the driving orifices 59. The other complementary driving contact element 45 is an edge of the other driving orifices 59.

Likewise, the driven contact element 49 is an edge of one of the driven orifices 61. The other complementary driven contact element 53 is an edge of the other driven orifices 61.

Typically, the driving and driven orifices 59, 61 are arranged at 90° relative to one another around the center C of the intermediate member 37.

The driving member 33 and/or the driven member 35 are also advantageously plates, typically thin metal plates. Each one has a thickness smaller than 3 mm, preferably smaller than 2 mm, and still more preferably smaller than 1 mm.

The or each plate is substantially perpendicular to the axes of rotation R1, R2.

The driving contact element 39 is a tab cut out in the driving member 33 (FIGS. 7 and 8). Typically, the other driving contact element 43 is another tab, also cut out in the driving member 33.

The tabs are typically bent substantially perpendicular to the plate.

Likewise, the driven contact element 47 and/or the other driven contact element 51 are tabs respectively cut out in the driven member 35. These tabs are typically bent perpendicular to the plate.

The tabs are engaged in the driving and driven orifices 59 and 61.

Advantageously, the driving contact element 39 and/or the driven contact element 47 include stops limiting the axial movement of the intermediate member 37 relative respectively to the driving and/or driven members 33, 35.

More specifically, the tab forming the driving contact element 39 includes tongues 71, 73 cut and bent such that these tongues no longer extend in the main plane in which the tab fits. When the tab is engaged in the corresponding driving orifice 59, the tongue 71 is placed between the intermediate member 37 and the driving member 33. On the contrary, the tongue 73 is placed between the intermediate member 37 and the driven member 35.

The tongues 71, 73 are bent on one side of the tab forming the element 39 (FIG. 7), so as to be placed in line with the edge of the driving orifice 59 defining the complementary driving contact element 41.

Likewise, the tab forming the driven contact element 47 has tongues 75, 77 cut and bent also so as not to fit in the same plane as the rest of the tab. When the tab is engaged in the driven orifice 61, the tongue 75 is placed between the driven member 35 and the intermediate member 37. The tongue 77 is placed between the intermediate member 37 and the driving member 33. The tongues 75 and 77 are bent on one side of the tab forming the element 47 (FIG. 10), so as to be placed in line with the edge of the driven orifice 61 defining the complementary driven contact element 49.

Advantageously, the other driven contact element 43 and/or the other driven contact element 51 also have stops, of the same type as described above.

Thus, the driving member 33, the driven member 35 and the intermediate member 37 are each an integral sheet.

The driving member 33 and the driven member 35 are obtained by stamping, cutting and bending of the sheet. This is also true for the intermediate member 37.

Advantageously, the driving elastic member 55 is a spring leaf.

The driving elastic member 55 includes a central part 79 by which the driving elastic member 55 is fastened on the intermediate member 37, and two end parts 81 and 83 cooperating with the contact elements 39 and 43.

The intermediate member 37 includes a fastener 85 of the driving elastic member. Typically, this fastener is a cut and bent tab, having a shape making it possible to pinch the central part 79 of the driving elastic member 55 against the intermediate member 37.

The driving elastic member 55 is configured so as to be alongside against the contact elements 39, 43 by curved areas, with no protruding edges.

Thus, as shown by FIG. 3, the end parts 81 and 83 of the driving elastic member 55 form bowed portions, which bear against the large faces of the tabs respectively located opposite the complementary contact elements 41 and 45.

The driving elastic member 55 is braced between the tab 85 on the one hand and the contact elements 39 and 43 on the other hand.

The driven elastic member 57 is of the same type as the driving elastic member 55.

The intermediate member 37 has a tab 87 for fastening the driven elastic member 57 on the intermediate member 37. This tab 87 pinches a central portion 89 of the driven elastic member 57 against the intermediate member 37. The end parts 91 and 93 of the driven elastic member 57 are in bearing against the tabs making up the driven contact elements 47, 51, and more specifically against the large faces of these tabs opposite the complementary contact elements 49 and 53. The driven elastic member 57 is braced between the tab 87 and the driven contact elements 47 and 51, and biases these elements along the second direction D2 against the edges of the driven orifices 61 that define the complementary contact elements 49 and 53.

The driven elastic member 57 is alongside against the driven contact elements 47, 51 by curved areas, with no protruding edges. These curved areas correspond to the end parts 91 and 93 of the member 57. In FIG. 3, only one of the two end parts 91 is visible.

The driving elastic member 55 and/or the driven elastic member 57 are preloaded. Thus, they only deform if a torque greater than 0.1 N·m, preferably greater than 0.3 N·m, is transmitted respectively between the driving member 33 and the intermediate member 37 and between the driven member 35 and the intermediate member 37.

The valve 1 further includes an elastic device 94, biasing the driven member 35 so as to move it axially away from the driving member 33.

The elastic device 94 advantageously comprises a helical spring 95.

The intermediate member 37 then has a central opening 97, passed through by the helical spring 95.

The helical spring 95 is kept in position on the driving member 33 and on the driven member 35 by raised areas 99, 101, respectively formed on the driving member 33 and the driven member 35.

The raised areas 99, 101 are typically stamped. The end turns of the helical spring 95 are in bearing around the raised areas 99, 101. Thus, the ends of the helical spring 95 are blocked in translation along the driving and driven members 33, 35.

The operation of the valve 1 will now be described.

In order to drive the flap 7 toward a first end position, the actuator 3 is turned on. The driving member 33 is rotated in the direction of rotation T1 (FIGS. 1 and 5) by the motor shaft 5. The other driving contact element 43 is in bearing directly against the other complementary driving contact element 45, such that the intermediate member 37 is also rotated, in the same direction. The complementary driven contact element 49 bears directly against the driven contact element 47, such that the driven member 35 is rotated by the intermediate member 37, in the direction T1. The driving 33, intermediate 37 and driven 35 members have the same rotation speed as long as the flap 7 is not at the end of travel, in bearing against the corresponding seat. Indeed, the motor torque remains below 0.1 N·m, the driving elastic 55 and driven 57 members keeping the contact elements in bearing against one another.

The elastic device 94 biases the driven member 35 axially toward the first bearing 17. This axial urging is transmitted by the driven member 35 to the sealing member 25. Thus, the sealing step 29 of the sealing member 25 is pressed against the complementary sealing step 31 of the complementary sealing member 27, and the sealing step 30 of the complementary sealing member 27 is pressed against the complementary sealing step 32 of the bearing 17. This guarantees sealing with respect to the exhaust gases.

When the flap 7 reaches its first end position, it abuts against the corresponding seat or stop. The rotational movement of the driven member 35 is then blocked. Conversely, the actuator continues to rotate the driving member 33, with an increasing torque.

When the torque transmitted from the intermediate member 37 to the driven member 35 exceeds 0.1 N·m, the other complementary driven contact element 53 loosens at least partially from the driven contact element 51.

At the same time, or shortly thereafter, the other complementary driving contact element 41 loosens from the driving contact element 39.

These loosenings are accompanied by a complex movement of the intermediate member 37, in a plane perpendicular to the axes of rotation R1, R2.

This movement is possible due to the fact that the orifices 59, 61 radially have a length greater than that of the contact elements 39, 43, 47, 51 and circumferentially have a width greater than the thickness of said contact elements. Thus, it is possible for the contact elements to travel within the orifices 59, 61.

The actuator 3 stops when the driving member 33 has performed a rotation of several degrees relative to the driven member 35. As a result, at the end of travel, the flap 7 is kept pressed against its seat with a significant torque. This prevents the vibrations of the flap 7 in this first extreme position.

The stopping of the actuator 3 is caused by the contact elements 39, 43, 47, 51 coming into contact with the edges of the orifices 59, 61 opposite the edges defining the complementary contact elements 41, 45, 49 and 53.

The stopping of the actuator 3 can also be caused when a predefined torque is reached. This torque is preferably greater than 0.1 N·m.

When the flap 7 must be driven along a second direction of rotation T2 opposite the first, the operation of the valve, in particular that of the kinematic chain 11, is completely symmetrical.

The valve described above has multiple advantages.

The driving member 33, the driven member 35 and the intermediate member 37 assume the form of plates. These plates have a large surface area, such that they serve as fins dissipating the heat transmitted by the drive shaft into the ambient air.

Furthermore, these plates form a shield with respect to the thermal radiation emitted by the body of the valve 13 toward the actuator 3.

These plates also form a shield limiting the convection of the heated air in contact with the valve body 13 toward the actuator 3.

The elastic device 94 guarantees the contact between the sealing steps 29 and 31, as well as between the sealing steps 30 and 32, and therefore prevents exhaust gas from leaking from the inside of the valve body 13 toward the environment.

The driving elastic 55 and driven 57 members ensure constant contact between the driving member 33 and the intermediate member 37 on the one hand, and between the intermediate member 37 and the driven member 35 on the other hand. These elastic elements guarantee a homokinetic transmission of the rotational movement from the motor shaft 5 to the drive shaft 9. They nevertheless allow, at the end of travel, the appearance of play between the driving contact element(s) and the complementary driving contact element(s), and between the driving contact element(s) and the complementary driving contact element(s).

The intermediate member 37 can move in translation relative to the driven member 35 without the contact between the driven contact element(s) and the complementary driven contact element(s) being broken in translation in the direction Dl.

Likewise, the intermediate member 37 can move in translation relative to the driving member 33 without the contact between the driving contact element(s) and the complementary driving contact element(s) being broken in translation in the direction D2.

The contact elements 39, 43, 45 and 51 cooperate with the corresponding slits to perform the following four functions:

Transmission of the torque between the driving member 33, the intermediate member 37 and the driven member 35;

Limitation of the axial translational travel of the intermediate member 37 relative to the driving 33 and driven 35 members, both toward the driving member and toward the driven member;

Limitation of the travel of the intermediate member 37 in a plane perpendicular to the axes of rotation R1, R2, in all directions;

Limitation of the angle of rotation of the intermediate member 37 relative to the driven member 35, and of the driving member 33 relative to the intermediate member 37, in the case where the flap 7 is blocked in rotation and where the actuator 3 applies a torque greater than the taring of the elastic members.

Advantageously, the driving member 33 and the driven member 35 are identical to one another. This reduces the manufacturing costs.

Likewise, the driving elastic member 33 and the driven elastic member 35 are advantageously identical to one another, which also contributes to reducing the manufacturing costs.

Typically, the intermediate member 37 is symmetrical. More specifically, the intermediate member 37 has first and second large faces that are opposite one another, and symmetrical to one another. Thus, the intermediate member 37 is capable of being mounted indifferently with the first large face facing the driving member 33 and the second large face facing the driven member 35, or with the first large face facing the driven member 35 and the second large face facing the driving member 33. This facilitates the mounting of the valve 1.

The respective sizes of the driving and driven orifices 59, 61 and of the contact elements 39, 43, 47, 51 are such that the intermediate member 37 can be off-centered relative to the driving member 33 and the driven member 35 in all directions.

The axial separation between the tongues 71, 73 and between the tongues 75 and 77 is such that a significant axial position allowance exists between the driving member 33, the driven member 35 and the intermediate member 37. The machining allowances and the thermal expansions can thus be absorbed without impact on the operation of the valve 1.

When the actuator is equipped with a position sensor, the latter can precisely measure the actual position of the flap 7 of the valve 1.

The kinematic chain can absorb the alignment flaws of the motor shaft 5 and the drive shaft 9, as well as the axial distance variations between these shafts.

The valve 1 can also have multiple variants.

The driving member 33 can include only the contact element 39, and not the other contact element 43. Likewise, the driven member 35 can include only the driven element 47, and not the other driven element 51. In this case, the intermediate member 37 includes only one driving 59 and/or driven 61 orifice.

The driving member 33 is, for example, fastened directly on the motor shaft 5. In a variant, the driving member 33 is fastened to an intermediate plate 103, which in turn is fastened directly to the motor shaft 5. This variant is shown in FIGS. 1 and 2. According to another variant, several intermediate plates, perpendicular to the motor shaft 5 and superimposed on one another, are interposed between the driving member 33 and the motor shaft 5.

The intermediate plates are separated from one another by an air knife, and are only in contact with one another by a limited number of points, so as to limit the heat transfers by conduction.

This makes it possible to increase the thermal uncoupling between the valve body 13 and the actuator 3.

Symmetrically, the driven member 35 can be fastened directly to the drive shaft 5, or on the contrary by one or several intermediate plates arranged as described above.

These intermediate plates are arranged in planes parallel to one another, and perpendicular to the axes of rotation. They are separated by air knives. They make it possible to increase the thermal uncoupling between the valve body 13 and the actuator 3.

According to another embodiment variant, the sole helical spring 95 is replaced by two independent elastic members. One of the two elastic members is compressed axially between the driving member 33 and the intermediate member 37, and the other one between the intermediate member 37 and the driven member 35.

The intermediate member 37 therefore does not have a central opening 97, which improves the thermal uncoupling between the valve body 13 and the actuator 3.

According to another embodiment variant, the valve 1 does not include a helical spring 95 of the type described above. This spring is replaced by elastic tongues formed in the intermediate member 37. These elastic tongues are of the type described in WO2010/103249. These tongues are integral with the intermediate member 37. Some tongues protrude relative to the large face of the intermediate member 37 facing toward the driving member 33. Said tongues are compressed axially between the driving member 33 and the intermediate member 37. They bear against the driving member 33.

Other tongues protrude axially relative to the large face of the intermediate member 37 facing toward the driven member 35. They bear against the driven member 35. They are compressed axially between the intermediate member 37 and the driven member 35.

In this embodiment variant, the intermediate member 37 does not include a central opening 97. The thermal uncoupling between the valve body 13 and the actuator 3 is therefore improved. Furthermore, the cost of the valve 1 is reduced because the helical spring 95 is eliminated.

Figure 11:
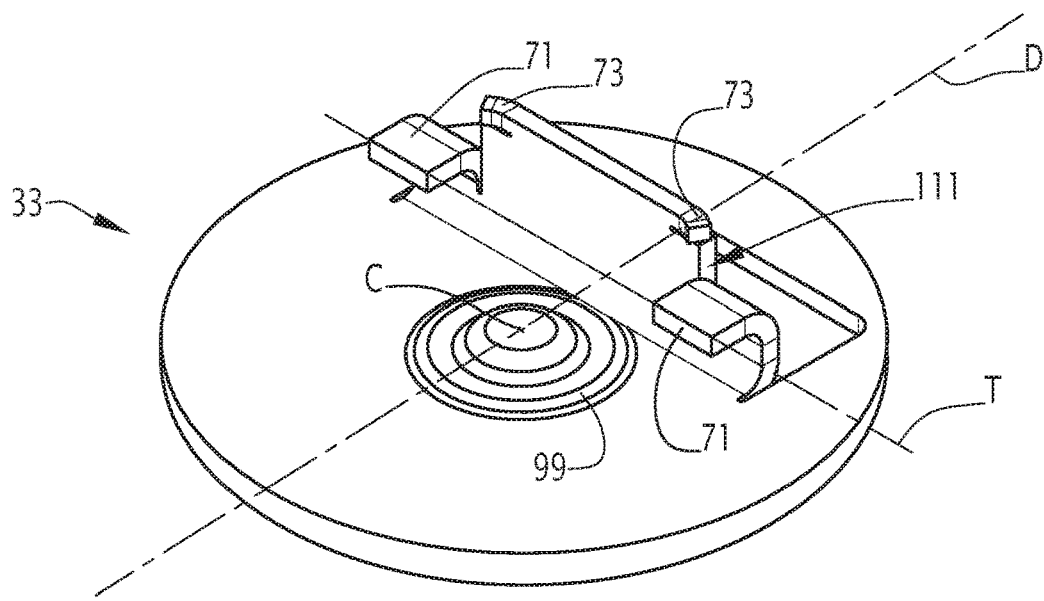
FIG. 11 is a perspective view of a driving member according to one embodiment variant of the invention.

According to still another variant, the two tabs of the driving member 33 and/or the driven member 35 are replaced by a single tab, with a large width, as shown in FIG. 11.

FIG. 11 shows a driving member 33 with a single tab. The driven member 35, if applicable, has substantially the same shape.

FIG. 11 shows a median line D passing through the geometric center C of the driving member 33 and splitting the latter into two equal parts. A transverse line T is also shown that is substantially perpendicular to the median line D. The single tab 111 extends in a plane substantially perpendicular to the median line D, and containing the transverse direction T. One transverse half of the single tab 111 is located on one side of the median line D, and the other half is on the other side.

A first transverse end of the single tab 111 defines the driving contact element 39, and the opposite transverse end defines the other driving contact element 43. Each of the two transverse ends of the single tab 111 bears tongues 71, 73, of the type described above.

When the driving member 33 is formed from a plate, the directions D and T extend in the plane of the plate.

The single tab 111 is offset along the median line D at a distance from the geometric center C of the driving member 33. The two transverse ends of the tab 111, making up the contact elements 39 and 43, are therefore not arranged on either side of the geometric center C.

In this embodiment variant, the two driving orifices 59 are replaced by a single orifice, with a larger width, dimensioned to receive the single tab 111.

This single orifice is offset at a distance from the center of the intermediate member 37.

The driven member 35, if applicable, is as described in reference to the driving member 33.

Figure 12:
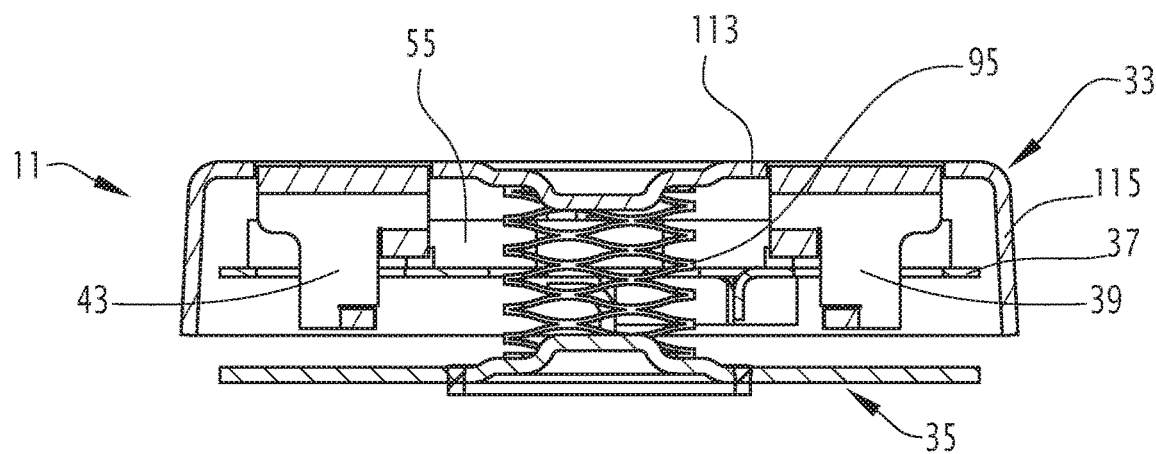
FIG. 12 is a sectional view of the kinematic chain according to another embodiment variant of the invention.

According to another embodiment variant, the driven member 35 or the driving member 33 has a bell shape. Such an embodiment variant is shown in FIG. 12. This variant makes it possible to protect the kinematic chain 11, the motor shaft 5, or the bearing 17 with respect to water sprays or foreign bodies (gravel), or with respect to streaming water.

In this embodiment variant, the driving member 33 or the driven member 35 includes a bottom 113 bearing the contact element(s), and a skirt 115 secured to the bottom 113 and surrounding the bottom 113.

The skirt 115 extends axially toward the driven member 35, in the case where the driving member 33 is bell-shaped. It, for example, extends axially practically up to the driven member 35. It therefore completely surrounds the space comprised between the bottom of the driving member 33 and the driven member 35. Conversely, when it is the driven member 35 that is bell-shaped, the skirt 115 extends from the bottom of the driven member 35 toward the driving member 33.

It should be noted that the skirt 115 can be open-worked in order to facilitate the circulation of air, so as to cool the elements of the kinematic chain 11.

According to still another embodiment variant, the driving 55 and driven 57 elastic members can be replaced by mutually independent helical springs. Each helical spring is arranged so as to urge one of the driving 35 or driven 33 contact members against the complementary driving or driven contact element. These springs are typically mounted on the intermediate member 37.

According to still another embodiment variant, the driving elastic member is arranged so as to urge the driving contact element 39 against the complementary driving contact element 41 in the first direction D1, and to urge the other driving contact element 43 against the other complementary driving contact element 45 in a direction opposite the first direction Dl. For example, the driven elastic member 57 is arranged in the same way. It biases the driven contact element 47 against the complementary driven contact element 49 in the second direction D2, and biases the other driven contact element 51 against the other complementary driven contact element 53 in a direction opposite the second direction D2.

In this case, when the motor shaft 5 is rotated in a first rotation direction, the driving contact element(s) abut directly against the complementary driving contact element (s) in order to transmit the torque from the driving member to the intermediate member.

On the contrary, when the motor shaft 5 is rotated in a second direction opposite the first, the torque is transmitted from the driving member to the intermediate member via the driving elastic member.

According to still another embodiment variant, one or several driving 33, driven 35 and intermediate 37 members are truncated, to facilitate the assembly.

One or several areas of the plate making up the driving 33, driven 35 or intermediate 37 member are cut to allow the assembly or travel of the member. The or each area is typically an edge area.

According to still another embodiment variant, one or several driving 33, driven 35 and intermediate 37 members are provided with a mistake-proofing hole or notch to prevent one or several of said members from being mounted backwards.

According to still another embodiment variant, the driving elastic member 55 and/or the driven elastic member 57 are respectively fastened on the driving member 33 and/or on the driven member 35, rather than on the intermediate member 37.

Figure 13:
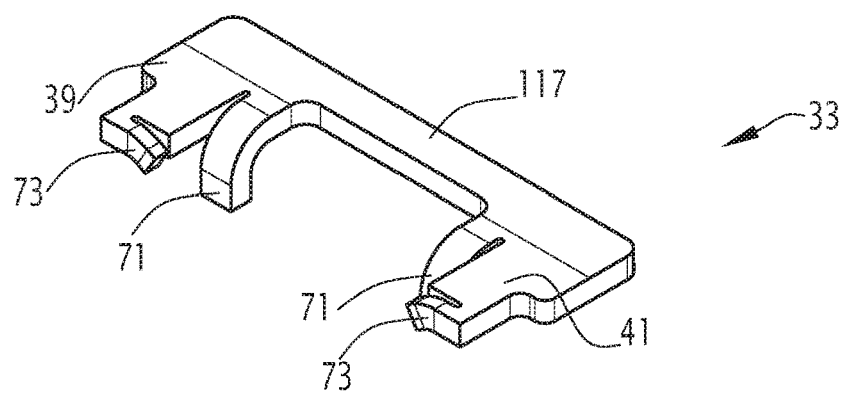
FIG. 13 is a perspective view of a driving member according to still another embodiment variant.

According to still another embodiment variant, shown in FIG. 13, the driving member 33 and/or the driven member 35 is a fork. In this embodiment variant, the driving member 33 and/or the driven member 35 does not include a part in plate form, forming the heat shield. The latter is replaced by a single radial strip 117, bearing the contact element(s).

For example, the driving member 33 is cut in a plate, and arranged in a plate containing the rotation axes. It is generally U-shaped, the two free branches of the U making up the driving contact elements 39. The driven member 35 is made in the same way.

According to still another embodiment variant, one or several of the driving 33, driven 35 and intermediate 37 members are covered with a layer with a high thermal emissivity, deposited in the form of a coating or a paint. Such a layer makes it possible to increase the quantity of heat discharged by radiation.

According to another embodiment variant, one or several driving 33, driven 35 and intermediate 37 members has a surface with a low thermal emissivity, for example brilliant or specular. This makes it possible to reduce the transfer of heat by radiation.

According to still another embodiment variant, one or several driving 33, driven 35 and intermediate 37 members has a non-flat surface, for example embossed or wavy. This makes it possible to increase the surface area of the surface diffusing the heat.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A valve comprising an actuator having a motor shaft, a flap having a drive shaft, and a kinematic chain coupling the drive shaft to the motor shaft in rotation, the kinematic chain comprising:
    a driving member rotating around a first rotation axis, and connected in rotation to the motor shaft; and
    a driven member rotating around a second rotation axis substantially aligned with the first rotation axis, and connected in rotation to the drive shaft;
    wherein the kinematic chain comprises:
    an intermediate member positioned axially between the driving member and the driven member, the driving member having a driving contact element in planar or linear bearing on a complementary driving contact element of the intermediate member, the driven member having a driven contact element in planar or linear bearing on a complementary driven contact element of the intermediate member, the complementary driving contact element and the complementary driven contact element forming an angle with one another comprised between 45° and 135°;
a driving elastic member inserted between the driving member and the intermediate member and urging the driving contact element against the complementary driving contact element;
a driven elastic member inserted between the driven member and the intermediate member and biasing the driven contact element against the complementary driven contact element.

2. The valve according to claim 1, wherein the driving contact element is substantially radial relative to the first rotation axis and the driven contact element is substantially radial relative to the second rotation axis.

3. The valve according to claim 1, wherein
the driving member comprises another driving contact element in planar or linear bearing on a complementary driving contact element of the intermediate member, the driven member comprising another driven contact element in planar or linear bearing on another complementary driven contact element of the intermediate member;
the complementary driving contact element and the other complementary driving contact element are substantially in the extension of one another;
the complementary driven contact element and the other complementary driven contact element are substantially in the extension of one another;
the driving elastic member biases the other driving contact element against the other complementary driving contact element;
the driven elastic member biases the other driven contact element against the other complementary driven contact element.

4. The valve according to claim 3, wherein
the driving elastic member biases the driving contact element against the complementary driving contact element along a first direction, and biases the other driving contact element against the other complementary driving contact element along the same first direction;
the driven elastic member biases the driven contact element against the complementary driven contact element along a second direction, and biases the other driven contact element against the other complementary driven contact element along the same second direction.

5. The valve according to claim 4, wherein the first and second directions are substantially perpendicular to one another.

6. The valve according to claim 3, wherein the driving contact element and the other driving contact element are positioned symmetrically relative to the first rotation axis, the driven contact element and the other driven contact element being positioned symmetrically relative to the second rotation axis.

7. The valve according to claim 1, wherein the driving elastic member and/or the driven elastic member are preloaded and only deform if a torque greater than 0.1 N.m is transmitted respectively between the driving member and the intermediate member and/or between the driven member and the intermediate member.

8. The valve according to claim 1, wherein the flap can be moved by the actuator between extreme positions, the flap abutting against a seat in at least one of the extreme positions.

9. The valve according to claim 1, wherein the kinematic chain comprises an elastic device axially biasing the driven member to separate the driven member from the driving member.

10. The valve according to claim 1, wherein the intermediate member is a plate.

11. The valve according to claim 10, wherein the intermediate member includes driving and driven orifices cut out in the plate, the complementary driving contact element and the complementary driven contact element being edges respectively of the driving orifice and the driven orifice respectively.

12. The valve according to claim 1, wherein the driving member and the driven member are plates.

13. The valve according to claim 11, wherein the driving member and the driven member are plates, and wherein the driving contact element and the driven contact element are tabs cut out in the driving member and the driven member respectively, and engaged in the driving and driven orifices, respectively.

14. The valve according to claim 1, wherein the driving contact element and/or the driven contact element include stops limiting the axial movement of the intermediate member relative to the driving and/or driven members.

15. A vehicle exhaust line comprising a valve according to claim 1.

* * * * *